United States Patent
Pitt (10) Patent No.: US 7,991,513 B2
(45) Date of Patent: Aug. 2, 2011

(54) ELECTRIC ENERGY BILL REDUCTION IN DYNAMIC PRICING ENVIRONMENTS

(75) Inventor: Ronald L. Pitt, Cardiff by the Sea, CA (US)

(73) Assignee: Ecodog, Inc., San Diego ( * ) Notice: Subject to any disclaimer, the term of this patent is extended or adjusted under 35 U.S.C. 154(b) by 506 days.

(21) Appl. No.: 12/117,638

(22) Filed: May 8, 2008

(65) Prior Publication Data

US 2008/0281473 A1 Nov. 13, 2008

Related U.S. Application Data

(60) Provisional application No. 60/928,367, filed on May 8, 2007.

(51) Int. Cl.
*G06F 17/00* (2006.01)
*G05D 11/00* (2006.01)
*G01R 11/56* (2006.01)

(52) U.S. Cl. ......... 700/295; 700/291; 700/296; 705/412

(58) Field of Classification Search ............... 700/22, 700/286, 291, 295, 296; 705/400, 412
See application file for complete search history.

(56) References Cited

U.S. PATENT DOCUMENTS

| | | | | |
|---|---|---|---|---|
| 6,732,019 | B2* | 5/2004 | Spool et al. | 700/291 |
| 6,961,641 | B1* | 11/2005 | Forth et al. | 700/295 |
| 7,062,361 | B1* | 6/2006 | Lane | 700/295 |
| 7,130,719 | B2* | 10/2006 | Ehlers et al. | 700/276 |
| 7,289,887 | B2* | 10/2007 | Rodgers | 700/295 |
| 7,343,226 | B2* | 3/2008 | Ehlers et al. | 700/276 |
| 7,349,766 | B2* | 3/2008 | Rodgers | 700/295 |
| 7,373,222 | B1* | 5/2008 | Wright et al. | 700/295 |
| 7,379,997 | B2* | 5/2008 | Ehlers et al. | 709/224 |
| 7,516,106 | B2* | 4/2009 | Ehlers et al. | 705/412 |
| 2006/0184288 | A1* | 8/2006 | Rodgers | 700/295 |

\* cited by examiner

*Primary Examiner* — Charles Kasenge
(74) *Attorney, Agent, or Firm* — Mintz, Levin, Cohn, Ferris, Glovsky and Popeo, P.C.

(57) ABSTRACT

A system that can save energy and reduce electric utility costs is disclosed. The system may include one or more current measurement devices communicating with a processor as well as one or more switching devices for controlling power consumption in response to utility rate pricing systems.

19 Claims, 6 Drawing Sheets

ELECTRIC ENERGY BILL REDUCTION IN DYNAMIC PRICING ENVIRONMENTS

CROSS-REFERENCE TO RELATED APPLICATION

This application claims the benefit of U.S. provisional patent application Ser. No. 60/928,367 filed on May 8, 2007 and entitled "Electric Energy Bill Reducer" which is incorporated by reference herein in its entirety.

FIELD

The subject matter described herein relates to reduction of electric energy bills.

BACKGROUND

Many electric utility companies use multi-tiered pricing when charging their customers for energy. The nature of these pricing policies can vary from utility company to utility company, but they generally fall into one of four categories.

Time of use (TOU) pricing charges customers different rates for energy based on what time of the day the energy is consumed. Prices are typically highest when the overall demand for energy is the greatest; for example during the hottest part of the day during summer in hot climates. TOU pricing is generally either two or three tiered. In two tiered pricing there are two rates for energy. The higher or peak rate applies during the peak demand times and the lower or off-peak rate applies at other times. In three tiered pricing a near-peak rate is added for the shoulder times around the peak times. Near-peak prices fall between the peak rate and the off-peak rate.

Customer profile pricing uses the customer's historical energy usage to establish a base-line usage that is measured against the current usage to establish the price of energy consumed. These comparisons are usually done on a monthly basis comparing year-over-year usage. For example, a customer that uses more KWH in August of 2007 than they did in August of 2006 would pay a higher price per KWH for their energy. Again there may be either two or three tiers of rates with each rate change point occurring at a set level above the historical usage. These levels can be either fixed KWH offsets or a percentage over the historical usage.

Peak usage pricing uses a fixed peak KWH value as a trigger for higher rates. This "target maximum" usage can be established as a daily target, a monthly target or both. Again, multiple tiers can be used with three being the usual maximum.

Threshold pricing establishes different prices for energy based on usage in a specific period. Table 1 illustrates a typical threshold pricing scheme. The time period for the thresholds can range from 15 minutes up to a month with the kWh limits adjusted accordingly.

TABLE 1

Example of a threshold pricing structure for electrical energy.

| Usage During Period (kWh) | Marginal Price per kWh |
|---|---|
| Less than 1 | $0.07 |
| Between 1 and 2 | $0.15 |
| Between 2 and 5 | $0.23 |
| Between 5 and 10 | $0.40 |
| Greater than 10 | $0.75 |

In all of the above pricing schemes, the actual limits, triggers and escalators for the rates vary from utility company to utility company. Some utility companies employ multiple schemes simultaneously. For example, an hourly threshold pricing structure can be established with different prices and thresholds based on peak/off-peak times. Likewise, TOU pricing may apply only during summer months and customer profile pricing apply the rest of the year. Additionally, each utility can differ in how the increased rates are applied. As an example, utilities employing peak usage pricing will either apply the higher rate to only the KWH consumed over the peak target while others will apply the higher rate to the entire month's KWH consumption if a single day's usage exceeds the peak.

The implementation of "Advanced Metering Infrastructure" or AMI by the utility companies allows them even greater flexibility in establishing fluid pricing for electricity. AMI meters are digital and have memory and a communications means. These meters can be read electronically by the utility company and provide usage information in time slices down to 15 minutes in duration. All of the major utilities are pursuing an AMI program for their residential customer base. This will allow them to adjust pricing as the wholesale price of electricity changes. The early adopters of this technology are using hourly pricing adjustments with plans to move to a system which adjusts pricing as frequently as every 15 minutes.

Various electric energy consumption measurement and monitoring products are currently available. These products range in functionality from measuring energy consumption of an entire facility to measuring energy consumption of a single appliance or load. Some systems provide for detailed reporting of the measured consumption both after the fact and in real time. Products which can control individual electric loads or appliances are also available. These products can turn loads on or off from a remote location. Some products provide controlling software which will instruct the system to turn loads on or off based on a user specified schedule. While these products can be helpful in reducing a consumer's overall energy consumption, they may not provide sufficient functionality to effectively reduce the consumer's energy bill in a multi-tiered pricing environment. Especially one in which the price of electricity can change every 15 minutes.

SUMMARY

In one aspect, a method includes collecting and storing historical data pertaining to time-dependent and load-specific usage of electrical energy by a system comprised of a plurality of electrical energy loads. A first electrical energy usage by the plurality of electrical energy loads for a first time increment and a second electrical energy usage by the plurality of electrical energy loads for a second time increment are projected using the historical data. The first electrical energy usage is converted to a first predicted energy expense and the second electrical energy usage is converted to a second predicted energy expense using a variable rate electrical energy pricing structure. The variable rate electrical energy pricing structure includes marginal rates for electrical energy that vary based at least on a time of day and on an amount of electrical energy used in a given time period. A load reduction and redistribution matrix is generated that reduces or transfers a use of at least one of the plurality of electrical loads from the first time increment to the second time increment based on a predetermined prioritization pattern to lower an total electrical energy bill for a billing period. The temporal load distribution matrix can then be promoted.

In an interrelated aspect, a method includes collecting total electrical energy usage data representing a total amount of electrical energy used by a system in a time increment and also collecting subcircuit-specific electrical energy usage data representing a subcircuit-specific amount of electrical energy used by each of a plurality of subcircuits in the time increment. The subcircuit-specific amounts of electrical energy contribute to the total amount of electrical energy used. A target reduction is identified in one of the subcircuit-specific amounts of electrical energy used to maintain the total amount of electrical energy used below a level that triggers an increase in a marginal rate for electrical energy pricing for the time increment. The target reduction includes one or more of delaying operation of a device that contributes to the subcircuit-specific amount of electrical energy used and operating the device that contributes to the subcircuit-specific amount of electrical energy used at a lower electrical energy demand during at least part of the time increment. The target reduction is promoted.

In some variations one or more of the following features can optionally be included. The promoting can optionally include providing, to a user via a user interface, a recommendation for reducing usage of one or more of the plurality of electrical energy loads during the first time increment and/or for temporally shifting usage of one or more of the plurality of electrical energy loads from the first time increment to the second time increment. Alternatively or in addition, the promoting can optionally include automatically reducing usage of at least one of the plurality of electrical energy loads in the system during the first time increment. The automatically reducing usage can optionally include sending a command to a switching device corresponding to at least one of the loads in the system, the command directing the switching device to cut off or curtail energy usage by the load during the first time increment.

Generating the load reduction and redistribution matrix can optionally include determining time-dependent load reduction targets that will achieve a target energy bill reduction for the billing period. The determining can optionally include identifying that the first electrical energy usage that has been projected will cause some electrical energy used during the first time increment to be billed at an elevated rate. Generating can optionally further include iterating through the plurality of electrical energy loads in the system for the first time increment to identify an electrical energy load that can be absolutely reduced or delayed to the second time increment in accordance with the predetermined prioritization pattern.

The predetermined prioritization pattern can optionally include priority values, which can optionally be user set and received via a user interface, for one or more of the plurality of electrical energy loads. The variable rate electrical energy pricing structure can optionally be received from an electrical utility over a network, optionally as a data stream output from a smart home energy meter. The data stream form a smart energy meter can also optionally include real time total usage of energy by the system.

Projecting the first electrical energy usage by the plurality of electrical energy loads for the first time increment and the second electrical energy usage by the plurality of electrical energy loads for the second time increment can optionally include predicting electrical energy usage by one or more of the plurality of electrical energy loads as a function of one or more of time of day, day of the week, and season using at least the historical data. Additional data can optionally be received that can be used with the historical data. The additional data can optionally include human occupancy data and/or weather data. The historical data can optionally be collected from a plurality of electronic monitoring devices, each monitoring and reporting electrical energy usage for one of the plurality of electrical energy loads.

In another interrelated aspect, a system includes a plurality of electronic monitoring devices, each assigned to one of a plurality of electrical loads and each reporting electrical energy usage data for the assigned electrical load as a function of time. A central controller executing software that receives the electrical energy usage data and also receives electrical energy pricing data is also included. The central controller executing software that causes it to perform a method as described above. One or more electronic switch devices, each assigned to one of the plurality of electrical loads, can also optionally be included in a system. An electronic switch device can receive a command from the central controller that directs the switching device to cut off or curtail energy usage by the load during the first time increment.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Various features of the subject matter described herein can provide one or more benefits and advantages that can include, but are not limited to, reduction of consumer electric energy bills; smoothing of temporal spikes in electrical energy demands; and intelligent allocation of demands and uses of energy from an electrical grid, local generation sources, and local storage capacity. Other benefits may also be associated with the current subject matter, and not every implementation will necessarily provide all of the potential benefits.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

The subject matter described herein provides methods, systems, techniques, apparatuses, and articles of manufacture that can be used to improve the economic efficiency of energy use by electric energy end users. In particular, the current subject matter can be applied in conjunction with new "smart" electric energy metering technology that bills a consumer using a real time, tiered rate structure in which the marginal price for electric energy increases with increasing usage during a given time period. The tiering structure can also change as a function of one or more of time of day, day of the week, season, and the like.

To effectively reduce a consumer's electric energy bills, a system can be programmed or otherwise provided with knowledge of the consumer's electric utility billing practices and manage the consumption of energy accordingly. This management can occur automatically through the use of remote on/off switches and/or power reduction circuits, smart appliances, controllable thermostats or other controllable devices. In the absence of such switches, effective electric bill reduction can be achieved by providing alerts, notifications, or recommendations to a consumer in advance of the need to reduce consumption. These alerts, notifications, or recommendations can allow the consumer to modify energy consumption behavior to avoid incurring a higher rate tier during a given electrical utility billing cycle.

In some implementations, each load in the home or facility can be characterized according to its usage and capabilities. This characterization can include the parameters shown in Table 2:

TABLE 2

Examples of parameters for characterizing electrical loads.

| Parameter | Possible Values |
|---|---|
| Control | Not controllable |
| | Manually controllable on/off |
| | Manually controllable attenuation |
| | Automatically controllable on/off |
| | Automatically controllable attenuation |
| Scheduling | No scheduling constraints |
| | Minimum daily run time required |
| | Time of day lockouts (on and off) |
| Prioritization | Relative ranking of the loads priority from always control for savings to never control for savings. |

Each of these characteristics can be individually and jointly applied to a single load. For example, a smart pool pump might be configured to be both manually and automatically controllable, have a minimum daily run time of 3 hours, never run at night with an "use when power is cheapest" prioritization. The system can use these characteristics to decide when to run each load in the home and when to not allow the load to run. The characteristics for a specific load can be set by the consumer or loaded with default values from a database of standard load types.

In one implementation, a system or method can allow a homeowner to specify how aggressive he or she desires the system to be in reducing the energy bill. For example, an option can be provided via which the consumer designates a threshold periodic energy bill amount that is not to be exceeded. For example, the consumer can specify that no monthly energy bill should exceed $200. The system can monitor the energy use, pricing and pricing policy used by the utility company and project that the current rate of consumption is too high to achieve the homeowner's instructions. The system can then begin turning off or attenuating non-critical electricity consuming equipment at times when the consumer indicates that they are not likely to be in use. For example, a thermostat can be turned down in the middle of the day or the middle of the night when the customer and/or family members are not likely to be home to use them. In a TOU billing environment, the system can reduce the duty cycle of various electrical appliances, such as for example a smart refrigerator, during peak hours.

Figure 1:
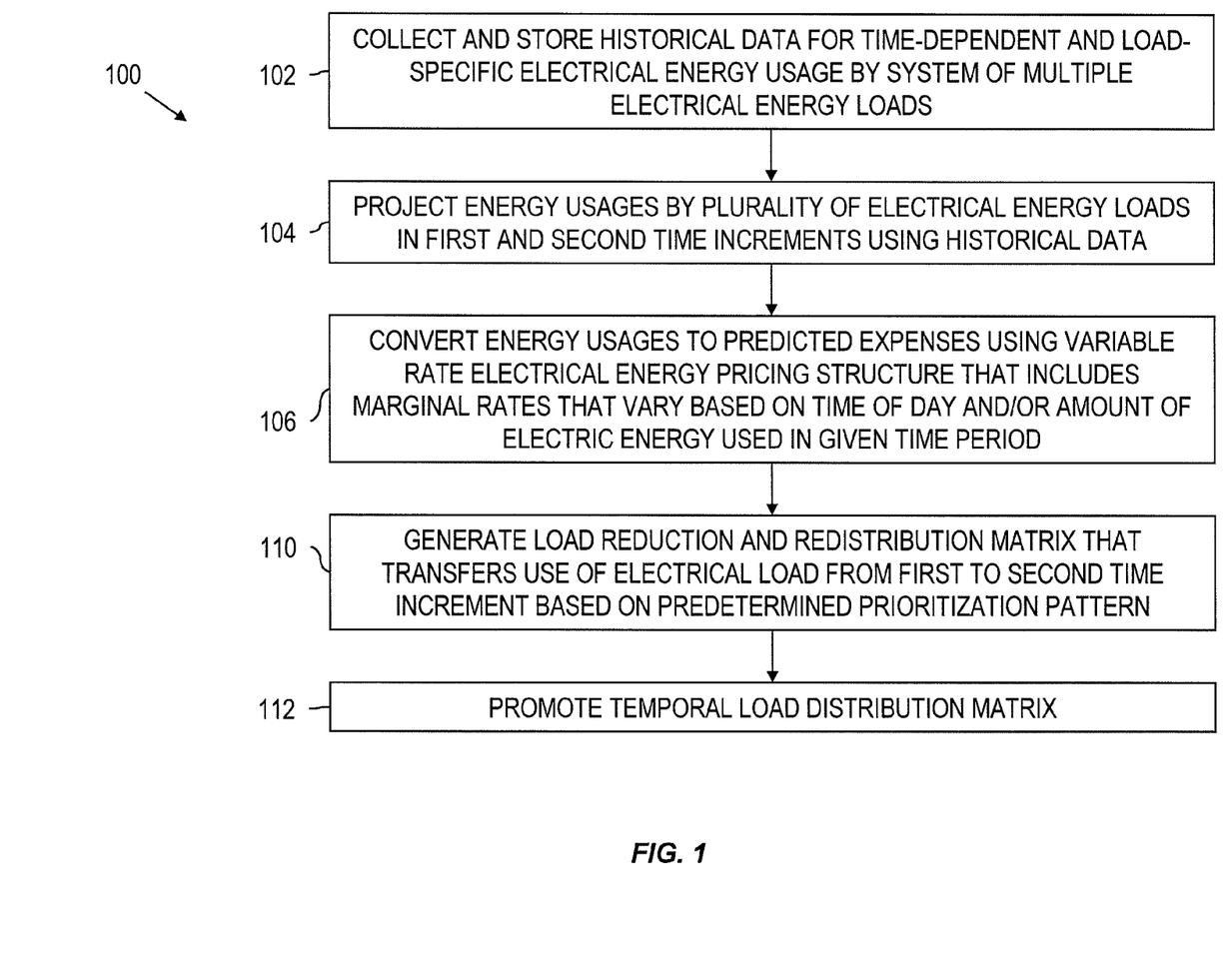
FIG. 1 is a process flow chart illustrating a method for electric energy bill reduction.

FIG. 1 shows a process flow chart 100 that illustrates a method for reducing electric energy costs for an end user. At 102, a projected electrical energy usage by a system is calculated for a first and a second time increment. The first and the second time increments are generally within a single billing period and can be, for example two consecutive time periods during which electrical energy use is metered and billed, for example by an AMI meter installed by an electrical utility company. The system can optionally be a residence, a building, one or more buildings, or any other collection of electrical loads whose electrical energy consumption is metered and billed using a time and/or usage dependent electrical energy pricing structure. The projected energy usage can include load-specific projected usages for each electrical load in the system. In some implementations, one or more measures of uncertainty, such as for example stochastic modeling or the like can be incorporated into the calculations, such as for example as described in greater detail below.

The projected usages are converted to a first projected increment expense and a second projected increment expense, respectively, for each of the time increments based on an electrical energy pricing structure for each time increment at 106. The electrical pricing structure includes marginal rates that vary based on time of day and/or an amount of electrical energy used in a given time period. Table 1 above showed an example of such a pricing structure. A total projected expense for the first and the second time increments can be calculated example by summing the first and the second projected increment expenses. A load reduction and redistribution matrix is generated at 110 based on one or more parameters relating to flexibility in total demand and/or timing of the projected usages during the two time increments. These parameters can be a predetermined prioritization pattern that can be entered and/or modified by a user via a user interface. The load reduction and redistribution matrix identifies time increments in which a given quantum reduction of electrical energy usage can have the greatest impact on the cost paid for electrical energy during a billing period and further includes suggestions for which of the electrical loads in the system could be reduced during the time increment to reduce usage. these suggestions are base don the predetermined prioritization pattern. The temporal load distribution matrix is then promoted for further application at 112. The further application can optionally be one or more of a recommendation for modifications to optional electrical energy usage that is presented to a user via a user interface, a command to a load controller or electronic switching device that can turn off and/or reduce power consumption by one or more of the electrical loads in the system, or the like.

The method can be extended for any number of time increments within a billing period. The projected usage can be based on one or more of historical usage data for the electrical loads that contribute to the total energy usage; observed trends or variability in the historical data; other factors that might influence electrical usage, such as occupancy of a residence or structure and climate data like current or projected temperature and relative humidity; and the like.

Figure 2:
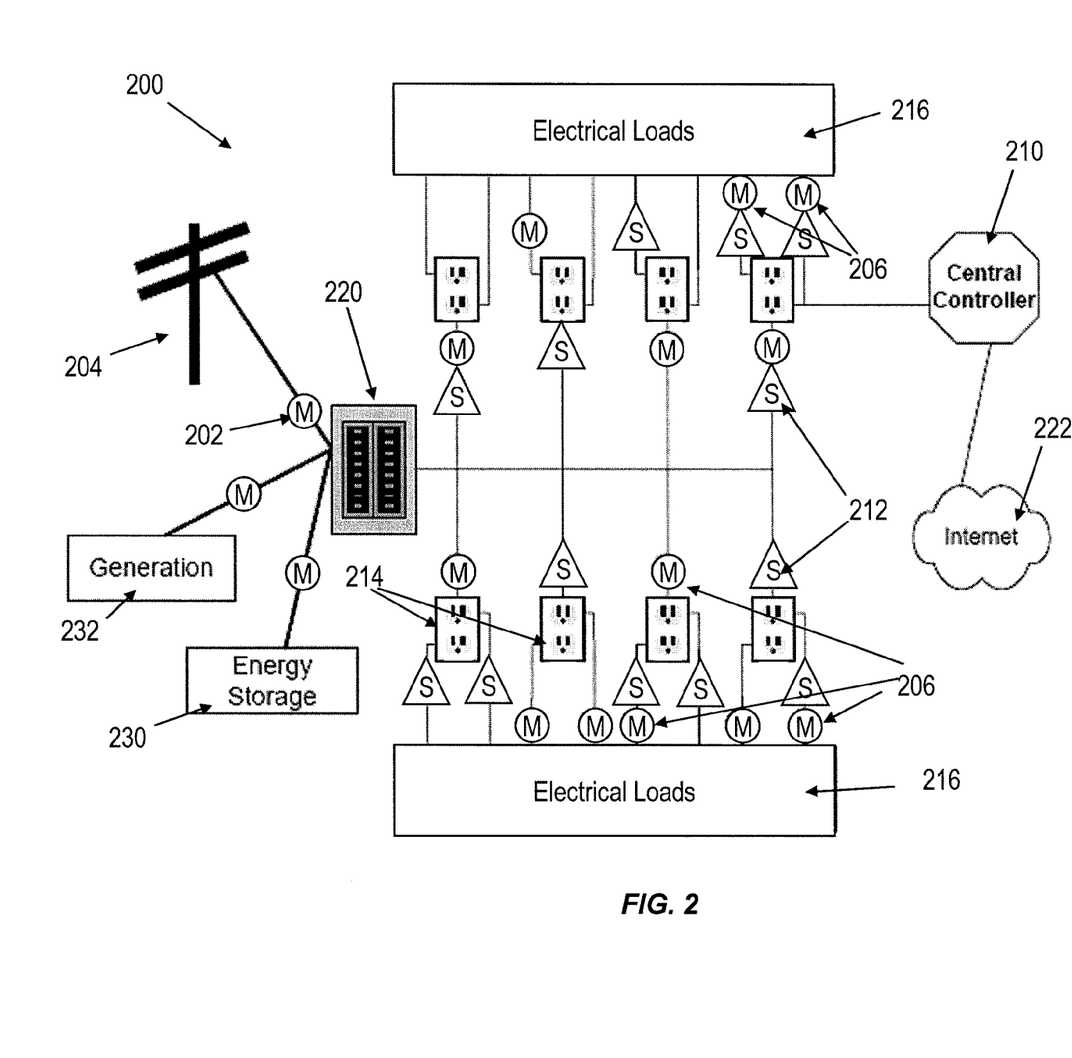
FIG. 2 is a schematic diagram showing a configuration of an energy usage monitoring system.

The currently disclosed subject matter can include one or more energy consumption measurement devices, optional load control switches and a central controlling device. FIG. 2 shows a schematic diagram 200 of one possible configuration of such a system. In one implementation, a system 200 can measure some or all of the electrical energy consumed by the facility being controlled. This can be accomplished in some variations using a single measurement device 202 at the service feed into the facility from the main power supply grid 204 and/or by using a combination of smaller, point of use measurement devices 206. The measurement 206 devices can communicate with a central controller 210 via a communication network, such as for example PLC, RF, Ethernet, WiFi, some other wireless network, or the like. In general, more detailed measurement data provided by multiple measurement devices can allow the system to perform more effectively.

A measurement device 206 can be placed on each of the breakers in the home or commercial facility and measurement 206 and switching or metering devices 212 can be placed on each of the loads that can be shed or modulated to vary their electrical energy consumption profile. In the case of a home, loads could include, but are not limited to, lighting, washers and dryers, HVAC systems, pool or spa equipment, refrigerators, computer equipment, audio-video equipment, and the like. The measurement devices 206 and switching devices 212 can be placed at various positions within the system as shown in FIG. 2. For example, measurement devices 206 can be inserted between wall outlets 214 and electrical loads 216 or between the main breaker box 220 and the wall outlets 214. Switching or metering devices 212 can similarly be placed at various points throughout the system. Selection of the locations of the measurement devices 206 and switching devices 212 can be based on one or more factors, such as for example the distribution of individual electrical loads among circuits, or ease of installation. For example, the measurement devices 206 and/or switching devices 212 can be placed between an outlet 214 and a load 216 if individual control of two devices on a single outlet or circuit is desired.

If the facility contains smart appliances such as controllable thermostats, smart refrigerators, programmable pool and spa equipment, controllable light switches, etc., these devices may be able to be controlled by the system without the need for additional measurement and/or switching devices installed. A network connection would be provided from the central controller 210 to each such device to enable communication between the built-in measuring, switching, or controlling devices and the overall system. The switching devices can be either binary (for example on/off switches) controllers or graduated controls that allow attenuated energy flow without completely shutting off a connected device. An example of a graduated control device that can be used as a switching device 212 is a programmable dimmer switch, such as those available for controlling lighting. Addition of a partial attenuation feature such as a dimmer can allow for more flexibility in shifting loads.

As stated earlier, switching devices 212 are not required for the system to function. Effective energy bill reduction can be accomplished through the use of user feedback. The use of switching devices 212 can allow the system to operate more efficiently and without the need for human intervention. This capability can be especially effective in environments where peak usage or threshold pricing is being employed. The switching devices 212 can generally communicate with the central controller 210, which be either an existing computer in the facility, such as for example a PC, or a standalone device provided with the system. The central controller can include hardware that provides communication with the measurement devices 206 and switching devices 212. Communication with the measurement and switching devices can be accomplished by one or more different network protocols or over multiple networking devices and systems. The central controller 210 can also provide a user interface or one or more other means by which a consumer can provide input and receive feedback from the system. Central control software that can provide the operating logic for the system can generally be run on the central controller 210 as well.

In some implementations, central control software (hereafter referred to as the software) can be included to take input from the measurement devices, the user and optionally from the utility company via the internet 222 or some other computer to computer network. The software can provide one or more functionalities, including but not limited to analyzing the energy consumption of the facility, the billing practices of the utility and the rules set by the user to make decisions as to when specific loads should be turned off. When it is determined that the energy consumption needs to be reduced the software can either turn off loads using remote controlled switches or alternatively notify the user which loads should be turned off and for how long. Connection to a network such as the internet 222 can also enable remote programming and modification of the central control software, for example when an electrical energy bill payer wishes to modify one or more parameters that impact operation of the system in his or her absence.

Figure 3:
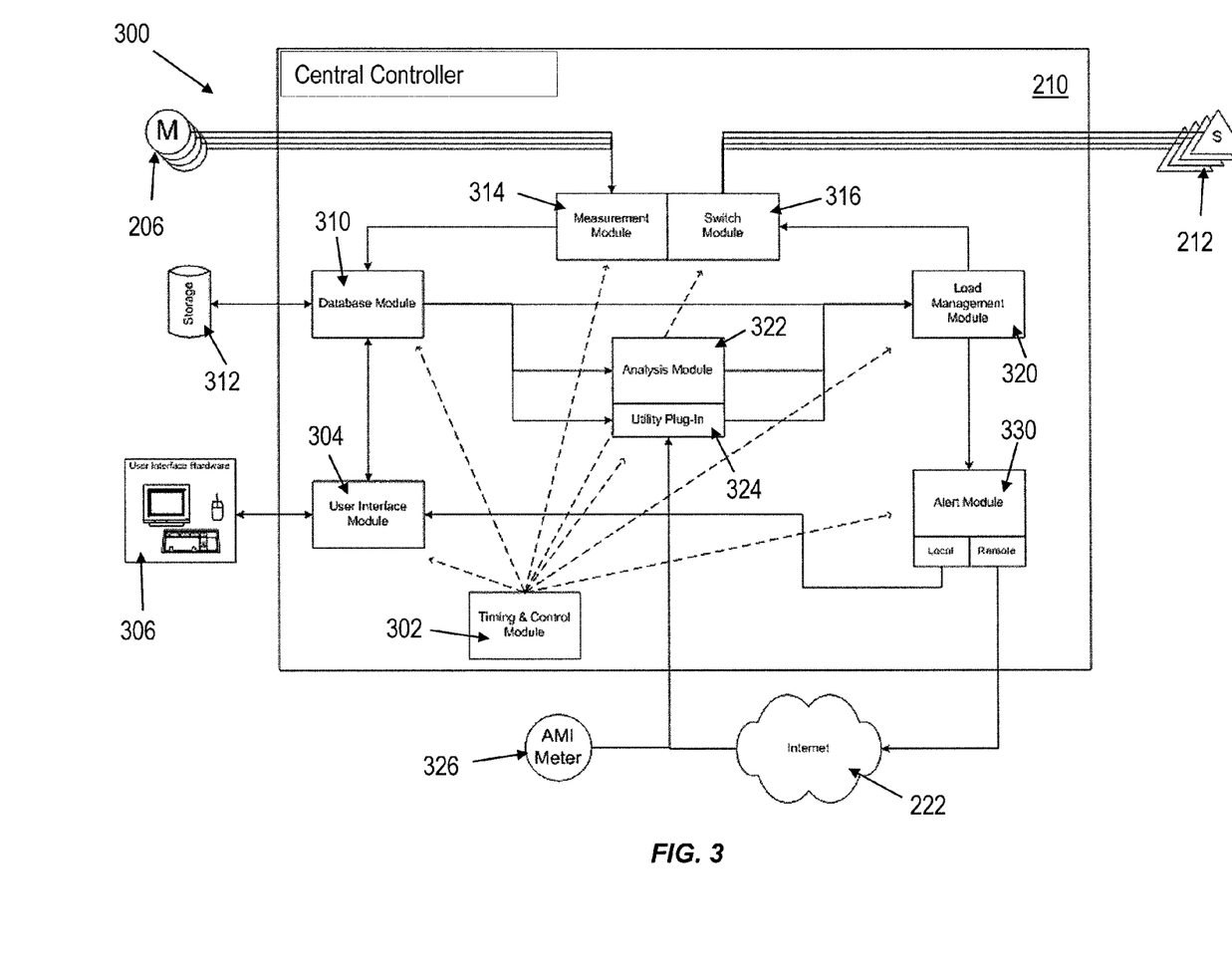
FIG. 3 is a software block diagram illustrating a central control software configuration.

FIG. 3 shows a top level block diagram 300 of control software that can run on the central controller 210 to implement one or more aspects of the current subject matter. In general, the control software can include one or more functional modules 302, 304, 310, 314, 316, 320, 322, 324, 330. These modules can exist as a single application or as multiple applications. While each of these modules can rely on data from one or more of the other modules, their function can in some variations be completely self contained and they can interact with the entire system by means of an inter-process communication mechanism. Various mechanisms can be used to communicate between these modules.

A timing and control module 302 can provide program control, hardware access, and resource management for the modules in the software. This module can optionally be hardware platform and operating system dependent and can provide one or more functions such as timing, task scheduling, and dispatching; hardware resource management and allocation; and abstraction of the hardware and operating system. These functions can be provided by an off-the-shelf real-time application software kernel or can be developed based on the teachings provided herein.

A user interface module 304 can provide user input and output services for the software. This module could also be hardware platform and operating system dependent. Various look and feel aspects may be incorporated into the user interface which use off-the-shelf GUI libraries or can be custom developed based on the teachings provided herein.

Various data can be input into the system via a user interface 306 or the like and stored for later use by the software. For example, system configuration information, such as identifications of measurement and switch devices as well as the loads to which they apply can be input and stored, as can utility billing practices and rates and bill reduction guidance. Bill reduction guidance can include one or more features that allow a user to specify how aggressively the system can be in reducing energy bills. The setting can be qualitative (i.e. very aggressive, moderately aggressive, not aggressive, etc.) or quantitative (i.e. Do not allow the monthly bill to exceed $150 and try to keep it below $100). Load shedding rules and device characteristics can also be input into the system via the user interface 306 and stored for later use via a database module 310 and a storage medium 312, such as for example a hard drive, flash memory, optical storage, or the like. For example, prioritized lists of loads that can be turned off when the system determines it is necessary to reduce energy consumption may be included. In some variations, lists can apply to time frame and/or financial status. Example time frames include but are not limited to time of day, day of week and month, and the like. Example financial statuses include but are not limited to utility pricing tier in effect, monthly bill projections, combinations thereof, and the like. Multiple lists can be used as the user deems necessary. One example of such a list could be "turn off loads 1, 2, and 3 if tier three pricing is in effect and the rates are highest (between 8:00 AM and 5:00 PM on Monday through Friday for example)." Alert notification methods can also be input and stored for later use. These settings can allow a user to specify the method of delivery used for the various user alerts generated by the system.

Various data can also be output to the user by the system via a user interface 306 or the like. These data can include real-time energy consumption information, such as for example energy consumption in the facility and for individual loads as measured by the system. Historical energy consumption reports can also be output. For example, these reports can be generated from the database in much the same way that financial reports are generated from accounting data. The user can be allowed to specify time frames, loads to include/exclude, totaling levels, and the like. In some variations, load shed alerts can be generated by the alert module and presented to the user in lieu of the system automatically turning off loads when needed. The user interface could also receive data inputs that might affect electrical usage projects. For example, a user could indicate days or times that a building is not expected to be occupied. These data could be incorporated into projections by affecting previously entered prioritizations of electrical loads—for example during a period of no occupancy, lighting loads could be given lower priority, as could climate control loads.

A measurement module 314 and a switching module 316 can be included to provide support for the measurement and switching devices in the system. The measurement module 314 can periodically poll each measurement device 206 and report the measurement data to the database module 310 for storage, for example on the storage medium 312. The measurement module could also optionally receive additional data inputs, for example from a temperature or relative humidity sensor, that could be used to modify projections of energy usage. A switch module 316 can accept on/off commands from a load management module 320 and forward them on to the target switching device 212. Specific implementations of each of these modules can depend on the specific devices selected for the system. These modules can be provided by the measurement device 206 or switching device 212 manufacturer or could be custom developed based on the teachings provided herein. These devices can also be embedded in an appliance such as in a smart refrigerator, HVAC system, or the like.

The database module 310 can be included to provide for storage and retrieval of system data such as for example the system configuration, measurement data, user settings and any module specific data such as the current list of switches turned on or off. Various database formats can be used with the current subject matter, including some currently available databases or alternatively a custom designed database developed based on the teachings provided herein.

Figure 4:
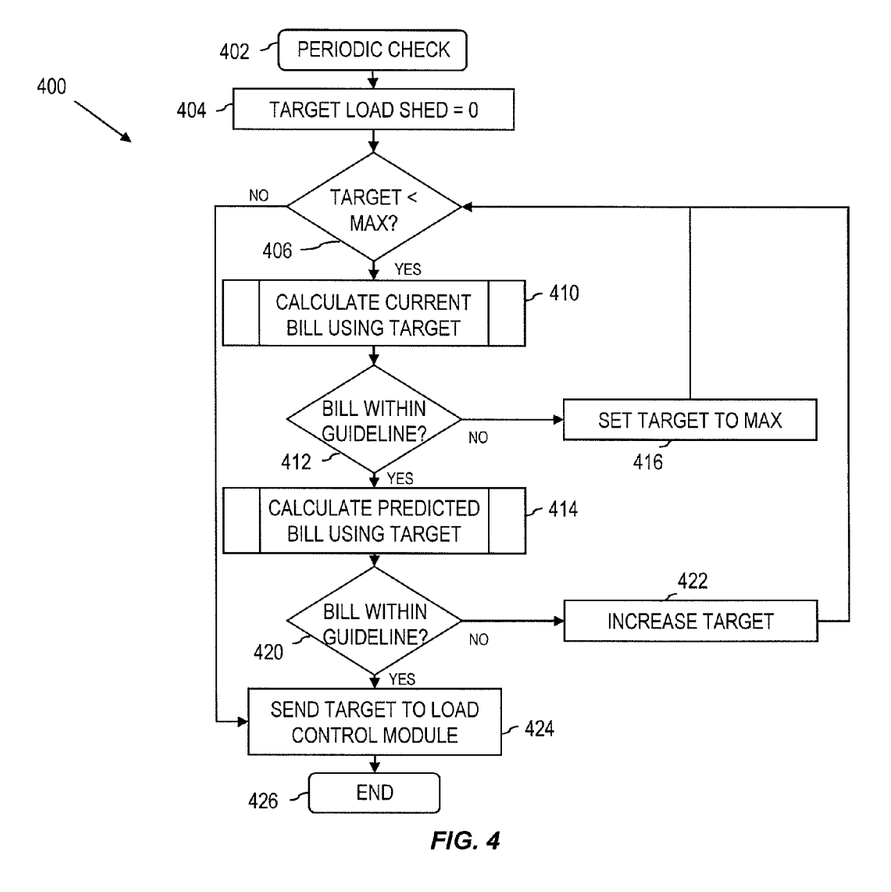
FIG. 4 is a process flow chart showing an analysis module method.

An analysis module 322 can be included to calculate the current and projected energy bill for the month. In one variation, this analysis module 322 can apply the user specified guidelines for bill reduction and load characteristics and can determine when and how much and at what time load reduction may be required to reach a given goal. The module can optionally include a utility plug-in 324 which can perform the calculations necessary to model the utility company pricing practices for a specific customer with a specific power company account. The analysis module 322 can optionally use the results of these calculations to make decisions. FIG. 4 shows a process flow chart 400 illustrating a method for use by the analysis module 322 which is discussed in greater detail below.

Utility plug-ins 324 can be written to implement a specific pricing policy for a utility company. In addition, the utility plug-in 324 can be programmed to get current pricing information from the utility company's web site or from an AMI meter 326 on the facility if available. If no web site or AMI meter 326 is available for the information, the user can be allowed to enter the price of electricity for each tier as well as the tier "trip points." This entry could in some implementations be performed via the user interface hardware or alternatively over a network connection, for example the internet 222. The nature of these data can differ for each utility plug-in. The utility plug-in 324 can optionally have access to the database (maintained by the database module 310) of current and historical electrical consumption data which can be used to calculate the price of electricity at a given time.

Figure 5:
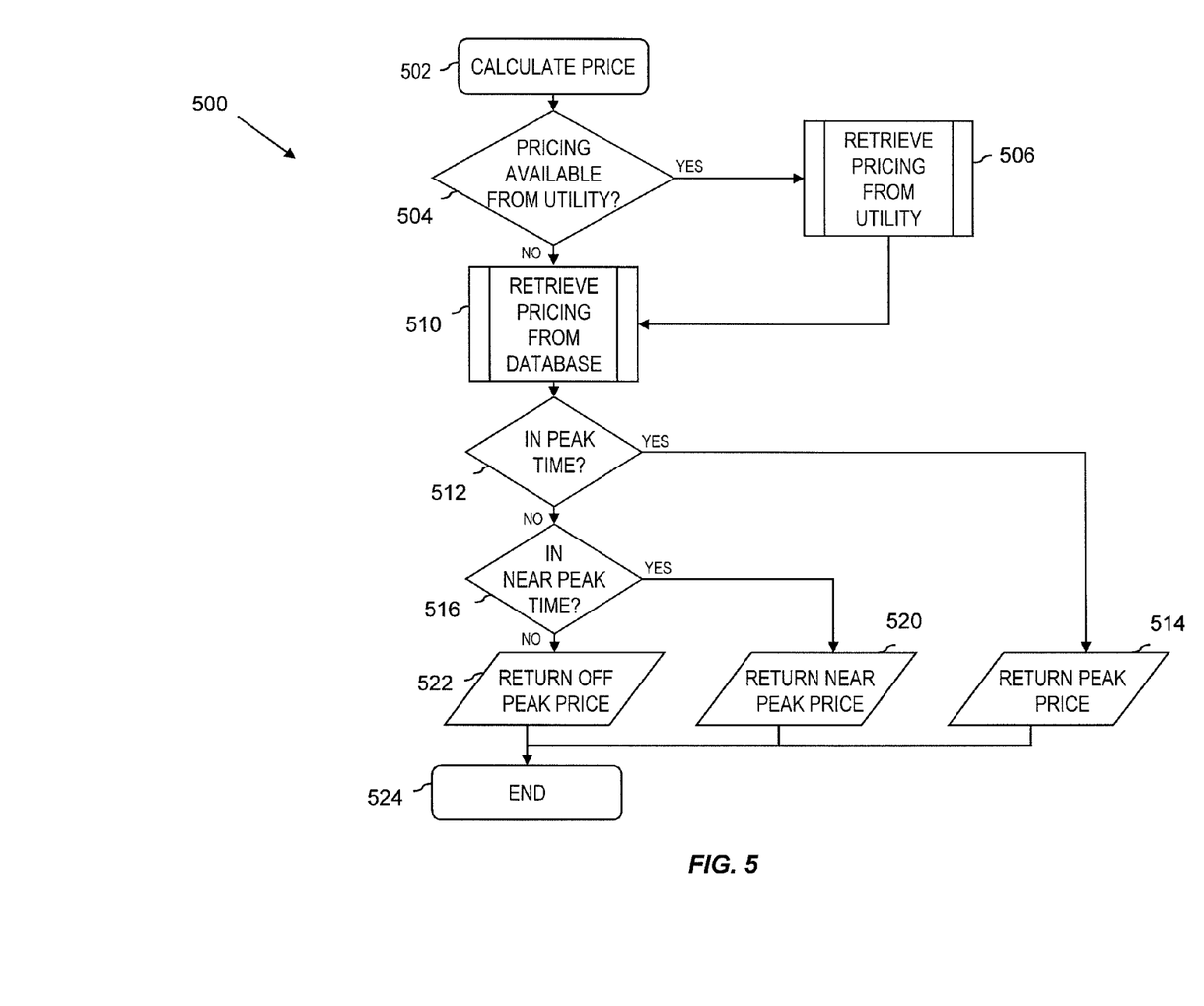
FIG. 5 is a process flow chart showing a TOU plug-in method.

The utility plug-in 324 can have an interface that can be configured to query and return the energy cost at a given date and time. Costs could be calculated linearly via repeated calls to this interface. Each call can optionally include the amount of energy consumed or projected to be consumed for a given time period, such as for example one hour of the billing period (for example one month). By making this call for each time period of the billing period, beginning at the start of the billing period, the analysis module 322 can be enabled to calculate both current and projected energy bills at various rates of use. FIG. 5 shows a process flow chart 500 illustrating an example of a time of use utility plug-in rate calculation and is discussed in greater detail below.

A load management module 320 can be included to take the target load shed value from the analysis module 322 and attempt to apply the load shed rules established by a user to reduce energy consumption. If the current load being shed is greater than the target load shed value then loads can be turned back on as appropriate. If the load management module attempts to turn a load on or off for which there is no remote control switch available, then the alert module 330 can be invoked to instruct the user to turn the load on or off. In addition, the load management module 320 can provide a periodic schedule of projected load shedding activities. For example, a schedule for the pool pump for the upcoming week could be generated. This schedule can be used by the system to automatically control the load or to notify the user of when to use the load. In addition, the projected load shed schedule can be used by the analysis module 322 to calculate projected energy usage thereby detecting peak or threshold usage events prior to their occurring. This information can be further used to refine the load shed schedule. By iteratively using this process, the system can "balance" the usage over time to achieve the lowest possible energy bill.

Figure 6:
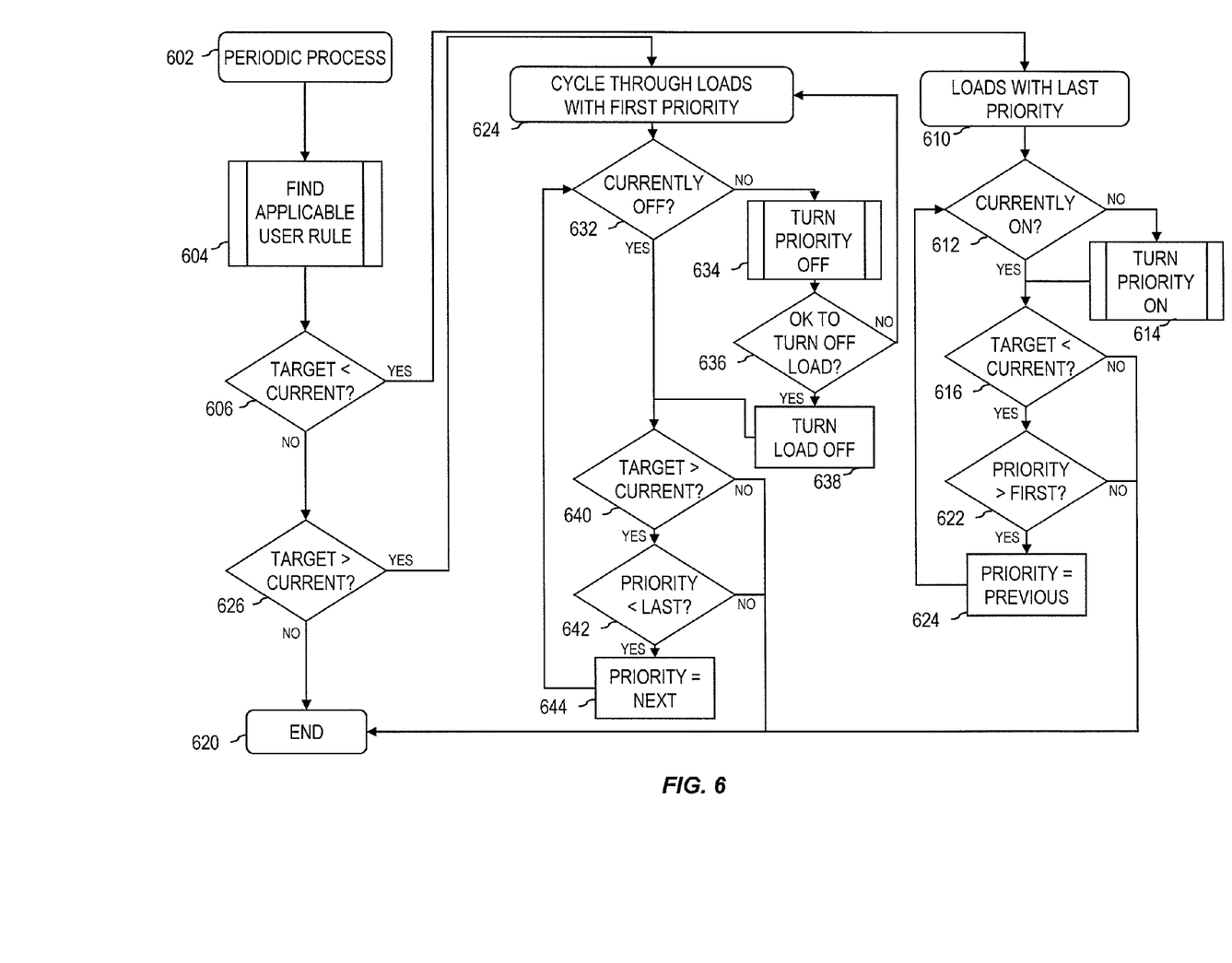
FIG. 6 is a process flow chart showing a load management module method.

Some loads such as air conditioners, refrigerators, pool heaters, etc. can be put on a reduced duty cycle as opposed to being turned off automatically. These loads could be designated as duty cycle loads and the max and min duty cycles could be loaded into the system as part of the system configuration parameters. Duty cycles less than 100% could be achieved by turning the controlling switch off and on at the appropriate rate or by sending a command directly to the appliance if this capability exists in the appliance. FIG. 6 shows a process flow chart 600 illustrating a load management module method, which is also discussed in greater detail below.

An alert module 330 can be included to notify a user when a load needs to be turned on or off to achieve the user's bill reduction guidelines. This alert module 330 can optionally send the alert locally via the user interface module 304 or via the internet 222 to a remote location such as an email address, cell phone, pager, etc. The alert delivery method used can optionally be configurable by the user.

FIG. 4 shows an example of a method for use by the analysis module 322. At 402, a periodic check is initiated to analyze the current load shedding by the system and to determine whether adjustments are needed. The periodic check can be initiated a time increment that can be current or in the future. For example, the analysis module 322 could query the effects of a load reduction in the current time increment, perhaps upon noting that the rate of electrical energy usage in the current time increment is faster than predicted based on historical data. Alternatively, the analysis module 322 could query the effects of a future load reduction on the overall electrical cost for a billing period. At 404, a variable that represents a target electrical load reduction to be performed is initiated to zero. This "Target" represents a simulated load shedding value or matrix that can encompass one or more or even every time increment in a billing period for electrical energy usage. For each increment in the Target matrix, the analysis module 322 can project electrical energy usage based on historical data (such as for example data collected from one or more installed monitoring devices 206) and then estimate a projected electrical energy bill by overlaying a rate structure that is obtained by the utility plug-in 324. This base estimate is performed with Target=0 to represent the projected electrical energy bill with no load shedding. FIG. 4 illustrates an example of an iterative process by which the analysis module 322 can calculate the target amount of load shedding that the system needs to bring a utility bill below a preset threshold or guideline that can be set by a user, for example using the user interface 306. The iterative process is started at 406. The iteration continues as long as Target remains less than a predetermined maximum value. The maximum value can be set by the user as an upper bound for how much the central controller can curtail electric energy usage in a given time period. A calculation of the current bill is performed at 410 using the current value of Target. If the calculation of the current bill is within guidelines (below the threshold level), then the value of Target is used to calculate a projected bill for the upcoming period at 414. If the value of Target is found at 412 to be insufficient to bring the current bill within guidelines, Target is set to its maximum value at 416 and the process returns to 406. The projected bill for the upcoming period can optionally be calculated at 414 using one or more of historical data, user inputs regarding expected loads or electrical needs, weather inputs, building occupancy projections, and the like. At 420, the projected bill is compared to the guidelines (threshold). If the threshold is exceeded (outside of the guidelines), Target is increased by some increment and the process returns to 406. If the projected bill is within guidelines at 420, the Target value is sent to the load control or management module 320 at 424. The process ends at 426 and waits for the start of the next periodic check at 402.

FIG. 5 shows an example of a time of use utility plug-in rate calculation. At 502, a price calculation process is initiated. The utility plug in 324 determines at 504 whether pricing is available form the utility, either over the internet or by some other means. If pricing is available, it is retrieved from the utility at 506. If not, at 510 utility the plug-in retrieves data from the database module 310. Next, the utility plug-in 324 determines at 512 whether the system is currently experiencing peak time pricing. This can be done based on comparison of the time of interest to the utility pricing data. If peak pricing is in effect, the peak price is returned at 514. If peak pricing is not in effect, the utility plug-in 324 next determines at 516 whether near peak pricing is in effect, and if so returns the near peak price at 520. The off-peak price is returned at 522 if neither peak nor near peak pricing are in effect. The routine ends at 524. It should be noted that the example shown in FIG. 5 is for a three-tier pricing schedule having peak, near peak (or "shoulder"), and off-peak pricing tiers. The current subject matter is also applicable to pricing schedules having any number of tiers from one to dozens or more.

FIG. 6 shows an example of a load management module method. At 602 a periodic process is initiated. An applicable user rule is identified at 604 from one or more rules that a user can set, for example via a user interface 306 or via a computer networked to the central controller 210. The load management module 320 compares the user rule to the current cost projections at 606. If the projection does not exceed the target cost set by the rule, the load management module selects a load that has the lowest current priority as assigned by the user. For example, a user might specify a pool pump as having the lowest priority, meaning that the load management module can always defer pool pump operation relative to other loads in an effort to achieve the target bill reduction. Higher priority loads could be lighting, cooking equipment, or entertainment equipment such as computers or televisions. Higher priority might be assigned to circuits serving devices that the user does not wish the central controller to automatically switch off or otherwise attenuate power usage without further input from a human being.

After selecting the last priority load at 610 and under the condition determined at 606 that the system target remains below the current usage, the load management module 320 can determine at 612 whether the last priority load is currently on. If not, the load can be switched on at 614 and a determination made at 616 of whether the current usage exceeds the target with the last priority load on. If no, the process ends at 620 and awaits the next period as all loads are allowed within the conditions set by the user rule at 604. If the target usage is less than the current usage with the low priority load on, the load management module at 622 determines whether the load priority is greater than first. If no, the process ends at 620. If yes, the load's priority is set to the previous value and the process ends at 620.

If at 606 the target is not less than the current, at 626 the load management module 320 determines whether the target exceeds the current. If not, the process ends at 620. If yes, the load with the first priority is identified at 630. The load management module 320 can determine at 632 whether the lowest priority load is currently off. If not, the state of loads with the current priority is set to off at 634. A sub-check can optionally be performed at 636 to verify that a given load that is set to be turned off is not designated as a protected load that the user has identified as not to be shut off for load management. If the load is approved for being turned off, it is set for turning off at 638 and the process continues. If the load is protect (not OK to turn off), the process returns to look for a next load with a first or high priority. A determination made at 640 of whether the current usage exceeds the target with the first priority load on. If no, the process ends at 620 and awaits the next period as all loads are allowed within the conditions set by the user rule at 604. If the target usage is more than the current usage with the first priority load off, the load management module at 642 determines whether the load priority is greater than last. If no, the process ends at 620. If yes, the load's priority is set to the next value AT 644 and the process ends at 620.

In some implementations, energy consumption of a single circuit, appliance, or other energy load or source can be predicted for a given time based on historical data for the load or source. In one example, the usage for a time period in a day of the week, such as for Sundays between 5:00 and 6:00 PM, is evaluated statistically and the mean, median and mode are calculated. The most likely consumption for this time period on this day of the week can be calculated as follows:

$$W_{pred}=[4\times mean+2\times mode+1\times median]/7 \quad (1)$$

where the $W_{pred}$ is the predicted energy usage in watts for a given time increment for a given day of the week. Equation 1 weights the mean at twice the mode and the mode at twice the median. Other formulas for calculating $W_{pred}$ are also possible. This calculation can be performed for historical data spanning a predetermined period of time, for example 8 weeks. A trend can be calculated such that 0=flat, 0.5=increasing 50% per week, −0.5=decreasing 50% per week, etc. The standard deviation of this data can also be calculated. The same calculations are made for this time period on any day of the week (in this example, between 5:00 and 6:00 PM), yielding $D_{pred}$, etc. These values are used to calculate predicted usage as follows. Note that the weekly and daily values are weighted based on the statistical validity of the data:

$$\text{Prediction}=((W_{pred}\times(1.0+W_{trend}))\times(W_{stddev}/(W_{stddev}+D_{stddev}))+((D_{pred}\times(1.0+D_{trend}))\times(D_{stddev}/(W_{stddev}+D_{stddev}))) \quad (2)$$

where $W_{trend}$ is the energy use trend for the time increment binned by day of week, $W_{stddev}$ is the standard deviation in W, $D_{pred}$ is the predicted usage for a given time increment regardless of the day of the week (for example between 5 and 6 PM for every day of the week), $D_{trend}$ is the energy use trend for the time increment for all days of the week, and $D_{stddev}$ is the standard deviation for D. The trend values can be used to more heavily weight more recent data in making projections.

In a home where there is an energy storage system, it is possible for the system to make decisions on when to buy energy from the utility, and when to sell energy back to the utility. FIG. 2 includes an optional energy storage device 230 and an optional generation device 232 that may be present in some systems. The storage device 230 could be an electric car that is connected to the house circuit when the car is at home. Alternatively, it could be one or more dedicated chemical batteries, fly wheels, hydro batteries, heat storage, or any other means for storing electrical energy for later use. The generator 232 could be photo-voltaic panels, wind generators, micro-hydro generators, hydro-carbon fueled generators, fuel cells, or any other kind of on-demand source of electrical power that could be activated by the central controller 210 as needed. The devices can be connected to the main system panel and equipped with monitoring devices 206 to determine energy flows from and/or to them.

The central controller 210 can decide to tap energy from the storage device 230 or based on the available capacity of the device 230 or generator 232 and its efficiency. If there is capacity available to store energy and the current cost of energy is less than the projected cost of energy in the near future after applying the storage system's efficiency losses, then the system could "buy" energy and store it for later use or sale. If there is energy stored locally and the current price of energy is higher than when the energy was purchased (after allowing for efficiency) then the system could use the stored energy to power the home. If the current stored energy is in excess of what is needed to power the home during the price peak, then the system would sell the stored energy back to the utility.

Likewise, in a home or system with a local energy generation source 232, the energy being generated locally could be used to provide electrical power, stored for future use/sale or sold back to the utility immediately depending on the current and future projected price of energy. The cost of generating the energy locally, if any, would be factored into the use/buy/sell calculation.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. A method comprising:
   obtaining an electrical energy pricing structure from an electrical utility providing electrical energy to a consumer, the electrical energy pricing structure comprising a first tiered marginal rate schedule for electrical energy usage occurring during a first rate period within a billing period and a different second tiered marginal rate schedule for electrical energy usage occurring during a second rate period within the billing period;
   projecting, based at least in part on historical data pertaining to time-dependent and load-specific usage of electrical energy by a plurality of electrical energy loads of the consumer, a first electrical energy usage by a first load of the plurality of electrical energy loads during at least one first time increment within a current or future electrical energy billing period and a second electrical energy usage by a second load of the plurality of electrical energy loads during at least one second time increment within the current or future electrical energy billing period;
   generating a first load reduction and redistribution matrix, the generating of the first load reduction and redistribution matrix comprising scheduling the first time increment to occur during the first rate period and the second time increment to occur during the second rate period based at least on a predetermined prioritization pattern;
   calculating, based on the electrical energy pricing structure, a first cost associated with energy usage scheduled according to the first load reduction and redistribution matrix;
   scheduling the first time increment and the second time increment during the billing period according to the first load reduction and redistribution matrix if the first cost is lower than a threshold;
   generating a second load reduction and redistribution matrix if the first cost is not lower than the threshold, the generating of the second load reduction and redistribution matrix comprising scheduling at least one of the first time increment and the second time increment to occur during a different rate period within the billing period than in the first load reduction and redistribution matrix;
   calculating, based on the electrical energy pricing structure, a second cost associated with energy usage scheduled according to the second load reduction and redistribution matrix; and
   scheduling the first time increment and the second time increment during the billing period according to the second load reduction and redistribution matrix if the second cost is lower than the threshold;
   wherein at least one of the obtaining, the projecting, the generating, the calculating, and the scheduling is performed by at least one processor.

2. A computer implemented method as in claim 1, wherein the predetermined prioritization pattern comprises priority values for one or more of the plurality of electrical energy loads.

3. A method as in claim 2, wherein the priority values are user set and received via a user interface.

4. A method as in claim 1, wherein the electrical energy pricing structure is obtained from the electrical utility over a network.

5. A method as in claim 4, wherein the electrical energy pricing structure is received as a data stream output from a smart home energy meter and wherein the data stream also includes real time total usage of energy by the consumer.

6. A method as in claim 1, further comprising promoting at least one of the first load reduction and redistribution matrix and the second load reduction and redistribution matrix, the promoting comprising providing, to a user via a user interface, a recommendation for reducing or temporally shifting usage of one or more of the plurality of electrical energy loads.

7. A method as in claim 6, wherein the promoting comprises automatically reducing usage of at least one of the plurality of electrical energy loads during at least one of the first rate period and the second rate period.

8. A method as in claim 7, wherein automatically reducing usage comprises sending a command to a switching device corresponding to at least one of the plurality of electrical energy loads, the command directing the switching device to cut off or curtail energy usage by the at least one load during at least one of the first rate period and the second rate period.

9. A method as in claim 6, wherein the promoting comprises automatically temporally shifting usage of at least one of the plurality of electrical energy loads from the first rate period to the second rate period.

10. A method as in claim 1, wherein the projecting comprises predicting electrical energy usage by one or more of the plurality of electrical energy loads as a function of one or more of time of day, day of the week, and season using at least the historical data.

11. A method as in claim 1, wherein the projecting is also based on additional data.

12. A method as in claim 11, wherein the additional data are selected from the group consisting of human occupancy data and weather data.

13. A method as in claim 1, further comprising collecting the historical data from at least one electronic monitoring device monitoring and reporting electrical energy usage for the plurality of electrical energy loads.

14. A method as in claim 1, wherein generating the first load reduction and redistribution matrix further comprises:
   determining time-dependent load reduction targets that will achieve a target energy bill reduction for the billing period, the determining comprising identifying that the first electrical energy usage will cause some electrical energy used during the first rate period to be billed at an elevated rate; and iterating through the plurality of electrical energy loads in the system for the first rate period to identify an electrical energy load of the plurality of electrical energy loads that can be absolutely reduced or delayed to the second rate period in accordance with the predetermined prioritization pattern.

15. A method as in claim 1, wherein the historical data comprise total electrical energy usage data representing a total amount of electrical energy used by a system in a given time increment and subcircuit-specific electrical energy usage data representing a subcircuit-specific amount of electrical energy used by each of a plurality of subcircuits in the given time increment, the subcircuit-specific amounts of electrical energy contributing to the total amount of electrical energy used; and wherein the first load reduction and redistribution matrix comprises a target reduction in one of the subcircuit-specific amounts of electrical energy used to maintain the total amount of electrical energy used during the first rate period below a level that triggers an increase in a marginal rate for electrical energy pricing for the first rate period according to the first tiered marginal rate schedule, the target reduction comprising one or more of delaying operation of a device that contributes to the subcircuit-specific amount of electrical energy used and operating the device that contributes to the subcircuit-specific amount of electrical energy used at a lower electrical energy demand during at least part of the given time increment.

16. A system comprising:

a plurality of electronic monitoring devices, each assigned to one of a plurality of electrical loads and each reporting electrical energy usage data for the assigned electrical load as a function of time; and a central controller executing software that receives the electrical energy usage data and also receives an electrical energy pricing structure comprising a first tiered marginal rate schedule for electrical energy usage occurring during a first rate period within a billing period and a different second tiered marginal rate schedule for electrical energy usage occurring during a second rate period within the billing period, the central controller executing software that causes it to:

project, based at least in part on historical data pertaining to time-dependent and load-specific usage of electrical energy by a plurality of electrical energy loads of a consumer, a first electrical energy usage by a first load of the plurality of electrical energy loads during at least one first time increment within a current or future electrical energy billing period and a second electrical energy usage by a second load of the plurality of electrical energy loads during at least one second time increment within the current or future electrical energy billing period;

generate a first load reduction and redistribution matrix, the generating of the first load reduction and redistribution matrix comprising scheduling the first time increment to occur during the first rate period and the second time increment to occur during the second rate period based at least on a predetermined prioritization pattern;

calculate, based on the electrical energy pricing structure, a first cost associated with energy usage scheduled according to the first load reduction and redistribution matrix;

schedule the first time increment and the second time increment during the billing period according to the first load reduction and redistribution matrix if the first cost is lower than a threshold;

generating a second load reduction and redistribution matrix if the first cost is not lower than the threshold, the generating of the second load reduction and redistribution matrix comprising scheduling at least one of the first time increment and the second time increment to occur during a different rate period within the billing period than in the first load reduction and redistribution matrix;

calculating, based on the electrical energy pricing structure, a second cost associated with energy usage scheduled according to the second load reduction and redistribution matrix; and scheduling the first time increment and the second time increment during the billing period according to the second load reduction and redistribution matrix if the second cost is lower than the threshold.

17. A system as in claim 16, further comprising one or more electronic switch devices, each assigned to one of the plurality of electrical loads, the one or more electronic switch devices receiving a command from the central controller that directs the switching device to cut off or curtail energy usage by the load during the first time increment; and wherein the central controller further sends the command.

18. A system as in claim 17, wherein the command from the central controller comprises directs the electronic switch device to temporally shift usage of the one of the plurality of electrical energy loads to which the electronic switching device is assigned from the first time increment to the second time increment.

19. A computer program product comprising a non-transitory computer-readable medium storing instructions that, when executed by at least one processor, cause the at least one processor to perform operations comprising:

obtaining an electrical energy pricing structure from an electrical utility providing electrical energy to a consumer, the electrical energy pricing structure comprising a first tiered marginal rate schedule for electrical energy usage occurring during a first rate period within a billing period and a different second tiered marginal rate schedule for electrical energy usage occurring during a second rate period within the billing period;

projecting, based at least in part on historical data pertaining to time-dependent and load-specific usage of electrical energy by a plurality of electrical energy loads of the consumer, a first electrical energy usage by a first load of the plurality of electrical energy loads during at least one first time increment within a current or future electrical energy billing period and a second electrical energy usage by a second load of the plurality of electrical energy loads during at least one second time increment within the current or future electrical energy billing period;

generating a first load reduction and redistribution matrix by, the generating of the first load reduction and redistribution matrix comprising scheduling the first time increment to occur during the first rate period and the second time increment to occur during the second rate period based at least on a predetermined prioritization pattern;

calculating, based on the electrical energy pricing structure, a first cost associated with energy usage scheduled according to the first load reduction and redistribution matrix;

scheduling the first time increment and the second time increment during the billing period according to the first load reduction and redistribution matrix if the first cost is lower than a threshold;

generating a second load reduction and redistribution matrix if the first cost is not lower than the threshold, the generating of the second load reduction and redistribution matrix comprising scheduling at least one of the first time increment and the second time increment to occur during a different rate period within the billing period than in the first load reduction and redistribution matrix;

calculating, based on the electrical energy pricing structure, a second cost associated with energy usage scheduled according to the second load reduction and redistribution matrix; and scheduling the first time increment and the second time increment during the billing period according to the second load reduction and redistribution matrix if the second cost is lower than the threshold.

* * * * *